United States Patent
O'Neill et al.

[11] Patent Number: 6,071,188
[45] Date of Patent: Jun. 6, 2000

[54] DAMPER AND EXHAUST SYSTEM THAT MAINTAINS CONSTANT AIR DISCHARGE VELOCITY

[75] Inventors: Charles H. O'Neill, Tully; Norman A. Goldschmidt; Ronald L. Benjamin, both of Syracuse, all of N.Y.

[73] Assignee: Bristol-Myers Squibb Company, New York, N.Y.

[21] Appl. No.: 08/846,749

[22] Filed: Apr. 30, 1997

[51] Int. Cl.[7] .................................................. B08B 15/02
[52] U.S. Cl. ............................................. 454/61; 251/212
[58] Field of Search ........................... 454/61, 351, 352; 251/212; 137/314

[56] References Cited

U.S. PATENT DOCUMENTS

| | | |
|---|---|---|
| 1,358,854 | 11/1920 | Kendall . |
| 3,517,961 | 6/1970 | Shorrock ................................ 251/212 |
| 4,207,864 | 6/1980 | Fischer et al. . |
| 4,269,166 | 5/1981 | Worley et al. . |
| 4,337,892 | 7/1982 | Diermayer et al. . |
| 4,608,961 | 9/1986 | Lanham, Jr. et al. ................. 126/21 A |
| 4,934,256 | 6/1990 | Modd et al. ............................... 454/61 |

*Primary Examiner*—Harold Joyce
*Attorney, Agent, or Firm*—Morton S. Simon

[57] ABSTRACT

An exhaust system has an air exhaust duct having a charge opening and a discharge opening and defining an air flow path. A damper is mounted in the duct for maintaining a constant air velocity for air exiting the discharge opening. The damper has opposing damper blades pivotally mounted within the duct. Each damper blade has an end that is pivotally mounted in cantilevered fashion within the duct so that an opposing end is free to move within the duct. Each damper blade is parabolic in shape and minimizes the air turbulence over the damper blade and reduces vibration. Each damper blade can be pivoted in response to a change in air volume discharged through the discharge opening to maintain a desired velocity of air through the discharge opening.

12 Claims, 6 Drawing Sheets

6,071,188

DAMPER AND EXHAUST SYSTEM THAT MAINTAINS CONSTANT AIR DISCHARGE VELOCITY

FIELD OF INVENTION

This patent application relates to a damper mounted in an air exhaust duct, and more particularly, to a damper mounted in an air exhaust duct that maintains a desired velocity of air through the discharge opening.

BACKGROUND OF THE INVENTION

Many states have stringent environmental laws that include a requirement that air exiting from an exhaust stack or air exhaust duct is discharged into the air at a predetermined height (or distance from intake ducts) and a preset velocity to ensure proper diffusion in the air of any chemicals that may be contained in the discharged air. For example, some states calculate the required discharge velocity based on the type of chemicals that are used in the facility. These discharge velocities from the stacks or ducts are generally in the range of 3000 to 3600 feet per minute.

In theory, this high discharge velocity high in the air dilutes the chemicals before they reach an area where someone might come into contact with them. As a result, the chemicals will not re-enter the facility in any measurable quantity. If the chemicals did re-enter, they might cause a health hazard to the occupants. Most of the regulations are based on a worse-case analysis, and often the discharge velocity is high enough that even a much greater percentage of chemicals than is allowed could be contained in the output and still be safe.

One problem facing many facilities that are covered by these regulations is the large constant volume of air which must be discharged from the facility to maintain velocity. For example, some research-based companies may have many thousands of individual inventors and researchers, each having a chemical fume hood which exhausts a large amount of air. The combination of many chemical fume hoods working at once creates a large volume of air that must be discharged through the stack or duct to maintain a high discharge velocity and ensure compliance with environmental regulations.

However, the amount of air which is required to be discharged from the chemical fume hoods and other sections of the facility may vary considerably during the day, and thus, the volume of air discharged from the facility could, if allowed, vary considerably over a daily period—thus, the popularity of variable volume exhaust systems which allow fume hoods t o use only the air that is required for research safety. For instance, at lunch time, the volume of discharged air could be reduced dramatically because many chemical fume hoods would be closed while workers take their lunch breaks. However, when the regulations require the velocity of discharged air to remain the same throughout the day, ambient air must be pumped into the stack to ensure constant discharge velocity. During those periods when many fume hoods and other parts of the facility are not discharging heavily, a large amount of ambient air must be pumped into the stack, increasing considerably the energy costs to run the facility. Even though the percentage of contaminants may be very small, the high discharge velocity is often maintained to ensure compliance with the environmental regulations and to minimize re-entrainment of exhaust into the building.

It would be advantageous if the energy costs associated with the maintenance of a high velocity discharge could be reduced by reducing the amount of ambient air that must be diverted into the stacks to maintain the required velocity through the stack outlet. Some straight baffle damper designs have been tried, but these designs have not been successful because the high velocity of air creates eddy currents behind the straight damper blades causing interior plume development (low level dispersion) and vibration. This vibration decreases the operating life of the stack. Also, the vibration of straight baffles causes a noise problem that could violate environmental regulations.

Examples of prior art in damper valves and devices which regulate flow through an exhaust shaft or duct include U.S. Pat. No. 1,358,854 to Kendall; U.S. Pat. No. 4,207,864 to Fischer et al.; U.S. Pat. No. 4,269,166 to Worley et al.; and U.S. Pat. No. 4,337,892 to Diermayer et al. None of these devices maintain a constant discharge velocity through a stack or duct when the total amount of discharged air decreases such as when chemical fume hoods shut down.

SUMMARY OF THE INVENTION

The present invention now allows a constant discharged air velocity through an air exhaust duct or stack opening without diverting large amounts of ambient air into the air exhaust duct to maintain the high discharge velocity required by environmental regulations. The present invention includes an air exhaust duct having a charge opening and a discharge opening defining an air flow path. A damper has opposing damper blades pivotally mounted within the duct. Each damper blade has an end that is pivotally mounted in cantilevered fashion such that an opposing end is free to move within the duct. Each damper blade is parabolic in shape to minimize the air turbulence over the damper blade and reduce vibration and pressure drop. Each damper blade can be pivoted within the duct in response to a change in discharged air volume from the discharge opening so as to vary the discharge opening in the duct and maintain the required discharge velocity as it exits the discharge opening.

In accordance with one aspect of the present invention, opposing shafts are mounted in the duct and extend across the duct adjacent opposing sides of the duct. The supported end of a respective damper blade is mounted on the shaft. Each shaft can be rotated to move the unsupported end of the damper blade within the duct. In another aspect of the invention, a crankarm is mounted to each shaft and the output shaft of a linear actuator is mounted to each crankarm for rotating respective shafts. A sensor measures the discharged air volume within the duct. A controller is operatively connected to the sensor and each damper blade for controlling pivotal movement of each damper blade in response to the measured change in air volume so as to maintain a substantially constant velocity of air through the outlet. A drip ledge is mounted in the duct adjacent to and under each supported end of each damper blade for collecting material such as precipitation that collects on the damper blade. The material then flows into a drain hole formed adjacent to the drip ledge.

BRIEF DESCRIPTION OF THE DRAWINGS

This invention and its mode of operation will be more clearly understood from the following detailed description when read with the appended drawings in which.

DETAILED DESCRIPTION OF THE INVENTION

Figure 1:
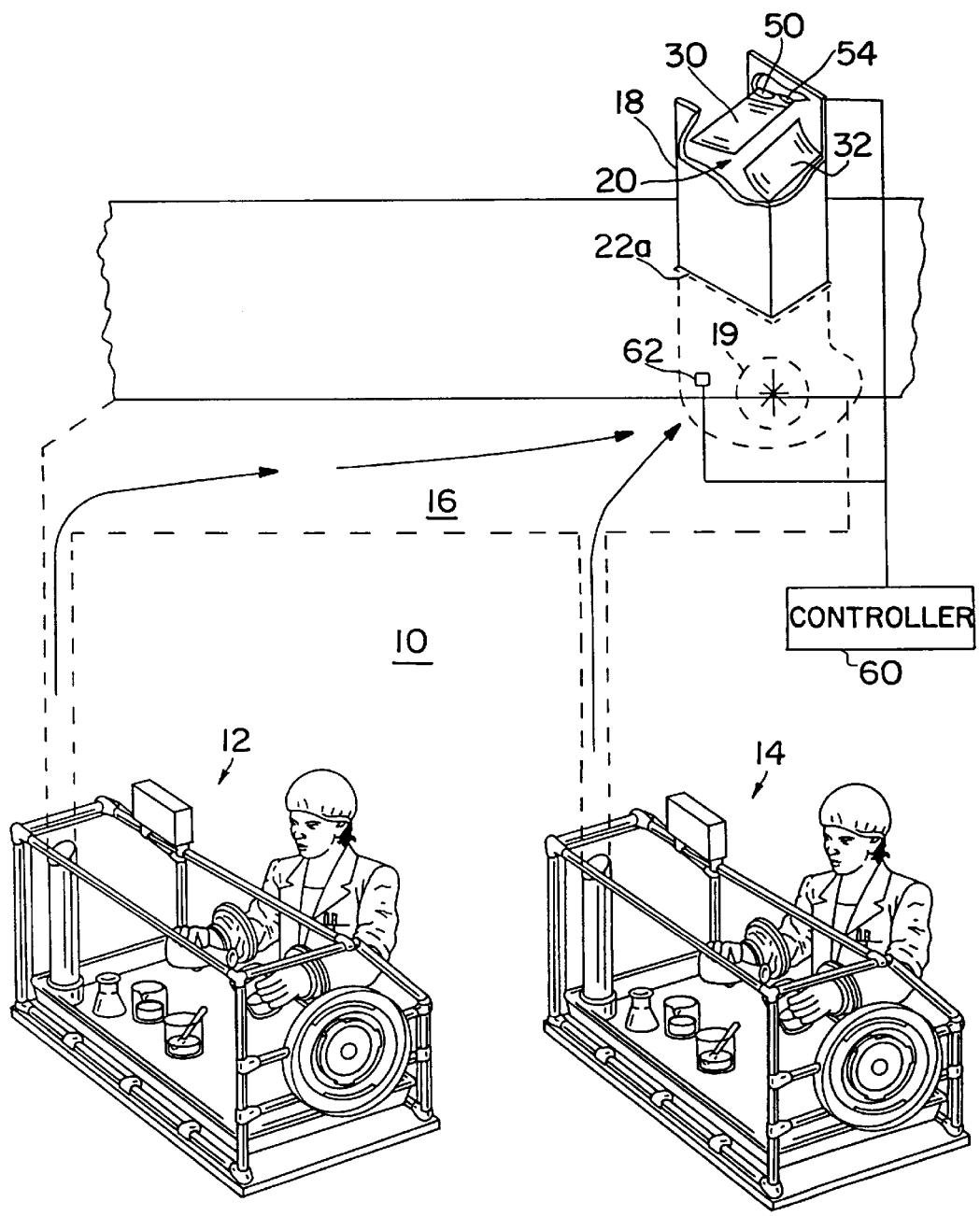
FIG. 1 is a generally schematic environmental view of a facility showing two fume enclosures on an exhaust system, and a damper in the air exhaust duct for maintaining a constant discharge velocity.

Referring now to FIG. 1, there is illustrated a general environmental view of a manufacturing facility 10 showing two chemical fume hoods 12, 14 that are connected into an exhaust system illustrated generally at 16. Although only two chemical fume hoods 12, 14 are illustrated, the facility 10 could contain dozens or hundreds of such chemical fume hoods, as well as other areas in the facility that discharge chemicals through the exhaust system 16. The exhaust system 16 leads into a single air exhaust duct (stack), illustrated at 18, which has a damper device, indicated generally at 20, and designed in accordance with the present invention that maintains a constant air velocity through the air exhaust duct 18 even though the amount of discharged air coming from the chemical fume hoods 12, 14 may vary. As noted before, environmental regulations require a constant air velocity exiting the air exhaust duct 18 so that the air is discharged into the air a sufficient height to prevent re-entrant of chemicals into the facility.

Figure 2:
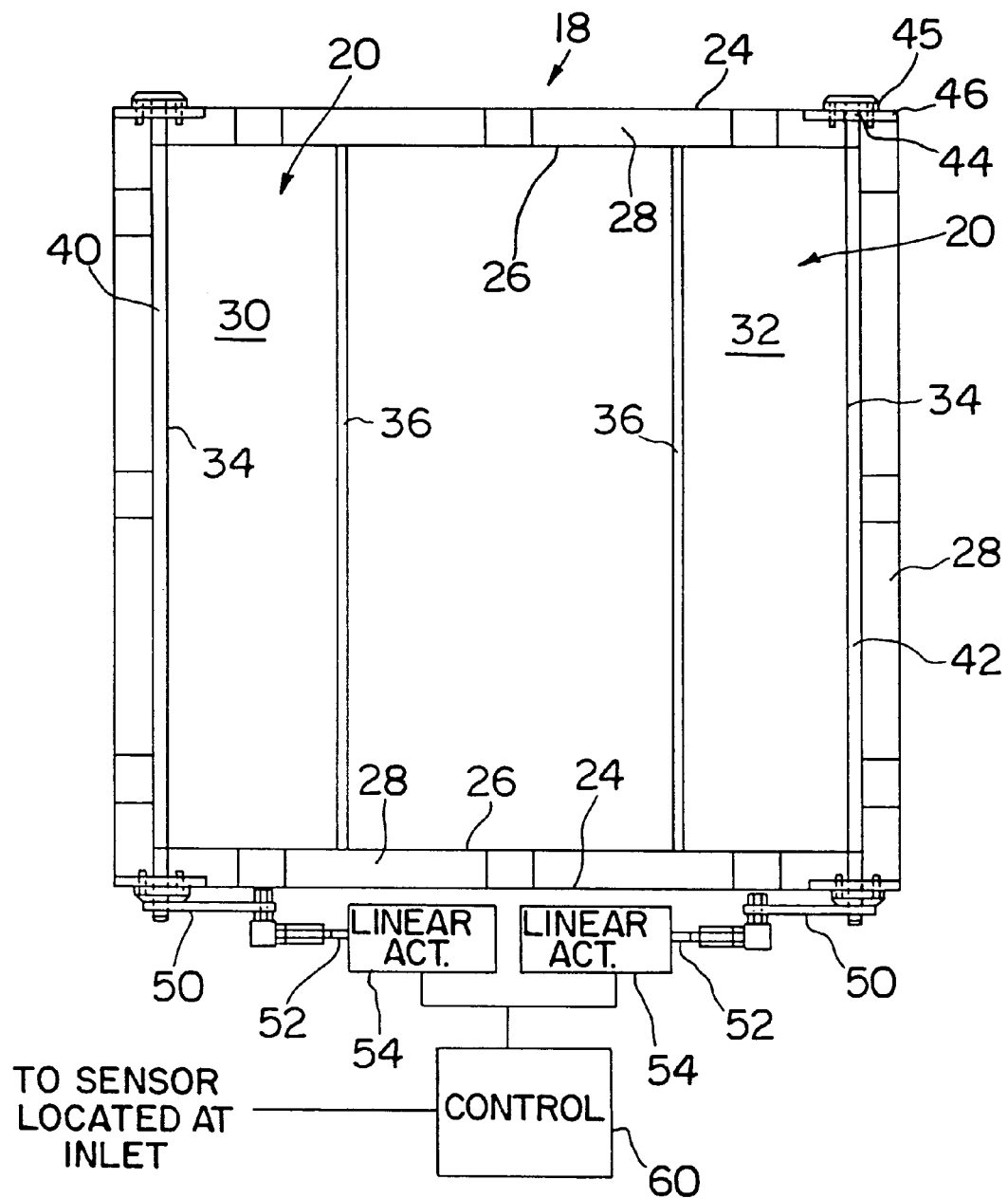
FIG. 2 is a top plan view of a duct showing the damper in accordance with the present invention.
Figure 3:
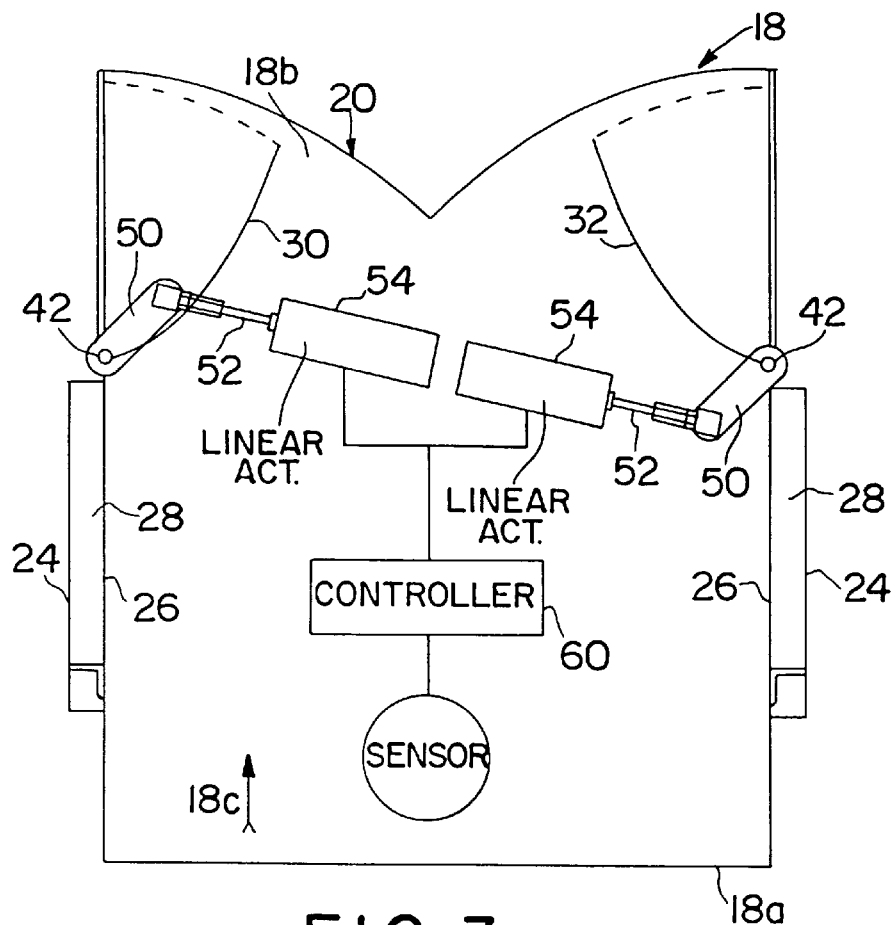
FIG. 3 is a partial sectional view of a duct showing the damper of the present invention.

FIGS. 2 and 3 illustrate an air exhaust duct 18 that is part of the exhaust system 16. The air exhaust duct 18 includes a charge opening 18a and discharge opening 18b (FIG. 3) defining an air flow path 18c. A fan 19 draws air from the fume hoods 12, 14 into the charge opening 18a. In this particular example, the duct 18 is about three and a half feet square, and could be formed from many different materials. One example typically found in the industry includes an air exhaust duct 18 formed as a distinct unit that fits into a rectangular configured exhaust fan discharge 22a (FIG. 1). The duct 18 can be formed from a sheet material such as ASTM 304 stainless steel. The structure includes a paintable outer wall 24 and a corrosion-resistant inner wall 26 forming a plenum 28 for the passage of precipitation and other material from the blades. The duct 18 could also be fabricated from other similar material, and even masonry or cast construction.

In accordance with the present invention, the damper device includes opposing damper blades 30, 32. The blades are pivotally mounted at one supported end 34, 34' within the air exhaust duct 18 as shown in FIG. 2. Each damper blade 30, 32 has its supported end 34, 34' pivotally mounted in cantilevered fashion in the duct 18 so that the opposing unsupported end 36, 36' is free to move within the duct.

Figure 7:
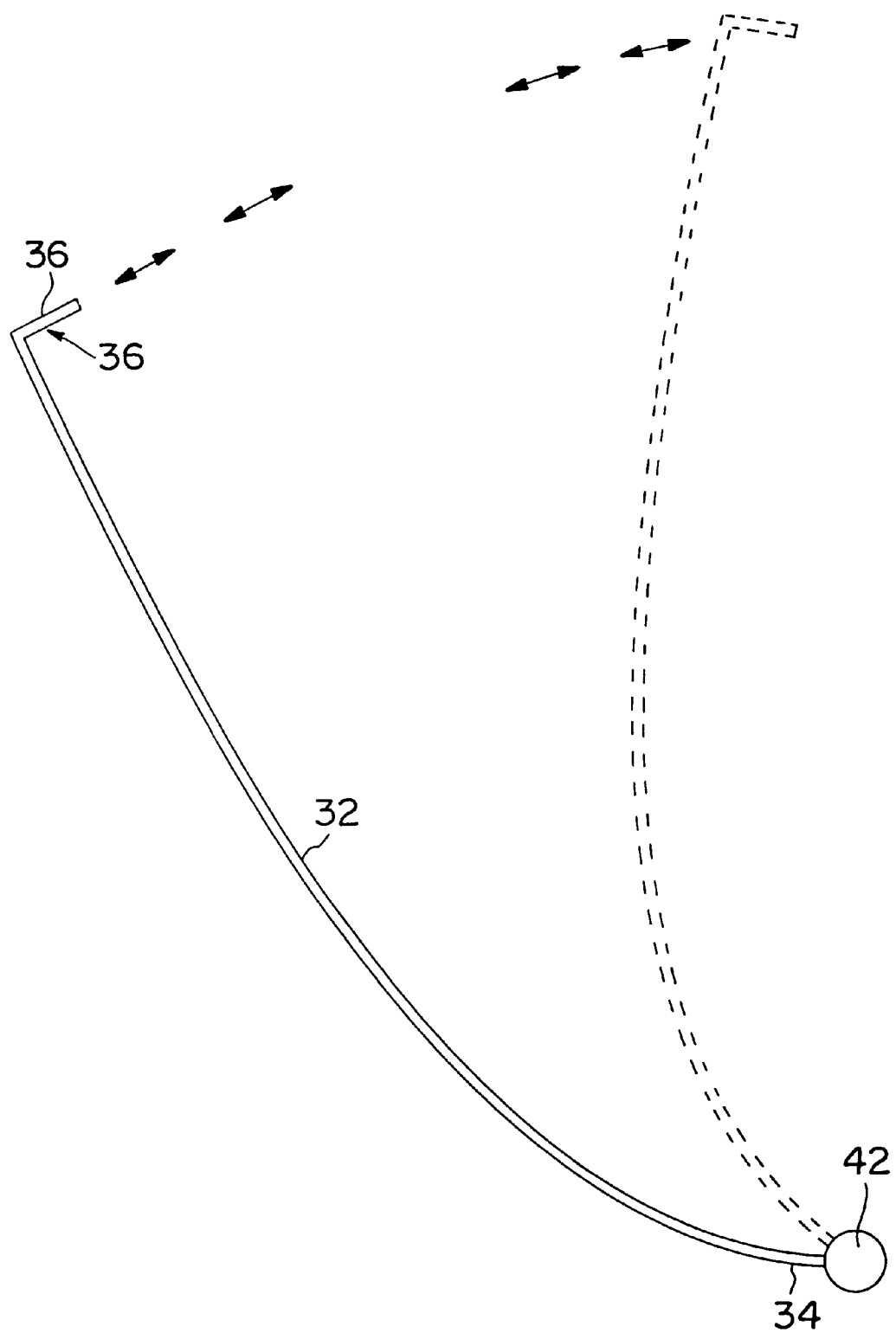
FIG. 7 shows the general outline of a typical parabolic damper blade and its range of travel in the present invention.

As shown in greater detail in FIG. 7, each damper blade 30, 32 is rectangular configured and parabolic in shape to minimize the air turbulence over the damper blade improve plume height and reduce vibration. It has been found that the use of a straight damper blade in this environment causes excess vibration of the damper blade when the high velocity air engages the blade, thus reducing the operating life of the damper. Also, the constant vibration can create noise pollution, which could violate some environmental regulations.

The shape of the parabola used for the parabolic damper blade of the present invention can vary depending on the required discharge velocity of the air and the size of the duct. Typically, a parabola has the general formula by=$ax^2$+c, where a, b and c could be numbers depending on various physical requirements such as those noted above. The unsupported end 36, 36' of the damper blade may include a 90 degree bend 36a, 36a' that forms a flange for rigidity. When the damper blades 30,32 are opposed to each other in a horizontal position, the flanges 36a,36a' meet and close off the duct 18.

Figure 8:
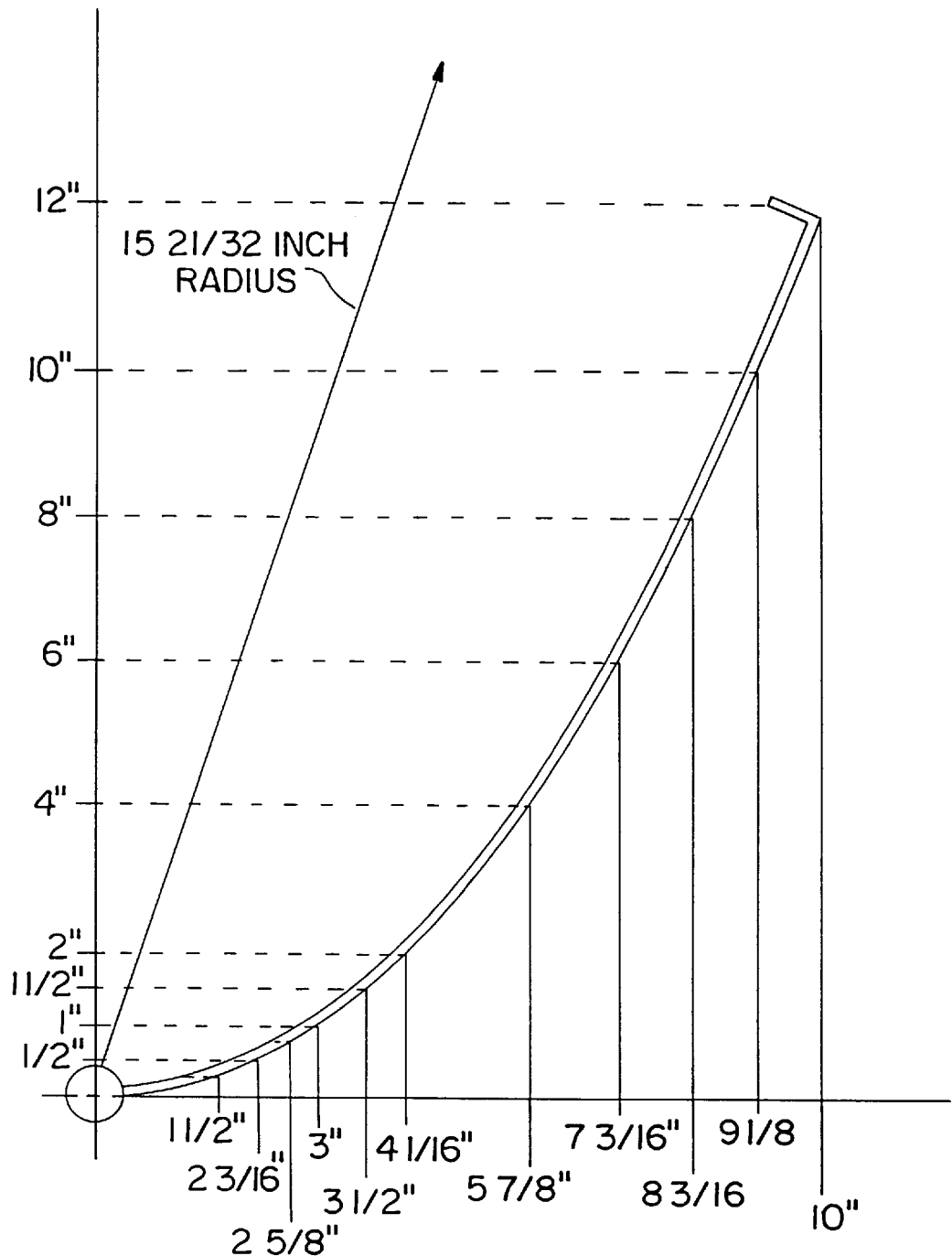
FIG. 8 shows a parabolic curve of a damper blade relative to a chart depicting the curve on an X-Y axis (outlines vary with blade size, but can conform to the formula by=$ax^2$+c).

FIG. 8 illustrates a graph showing one type of parabola that could be used in the described air exhaust duct 18. This is only one example of a parabolic damper blade that could be used. Other parabolic blades can be designed by those skilled in the art depending on the design of the facility, the desired air discharge velocity, and the type of air exhaust duct used in the facility.

Referring now to FIGS. 2 through 6, there is illustrated one example of a mounting system for the damper blade used in the present invention.

Figure 4:
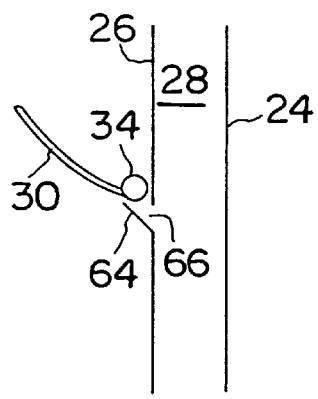
FIG. 4 is an enlarged view of the shaft connection of a damper and showing a drip ledge and a drain hole.

As shown in FIGS. 2 and 3, opposing shafts 40, 42 are rotatably mounted on opposing sides within the air exhaust duct 18. Each blade 30, 32 is mounted at its supported end 34,34' to respective shafts 40, 42, such as by a welded seam as shown in FIG. 4. The shaft can be mounted for rotatable movement by bronze or other bushings 44 that are mounted outside the outer wall 24.

At each end of the shaft 40, 42, an end support 45 holds a bronze bushing 44 through which the shaft extends. The end support 45 is fixed to the outer wall 24. A backing plate 46 is mounted in the plenum 28 and supports the shaft on the inside wall surface of the air exhaust duct 18. The end support 45 is secured to the backing plate 46 by fasteners, such as bolts 45a. Each shaft extends outward from the outer wall 24. A shaft collar 48 prevents the sliding of the shaft.

Figure 5:
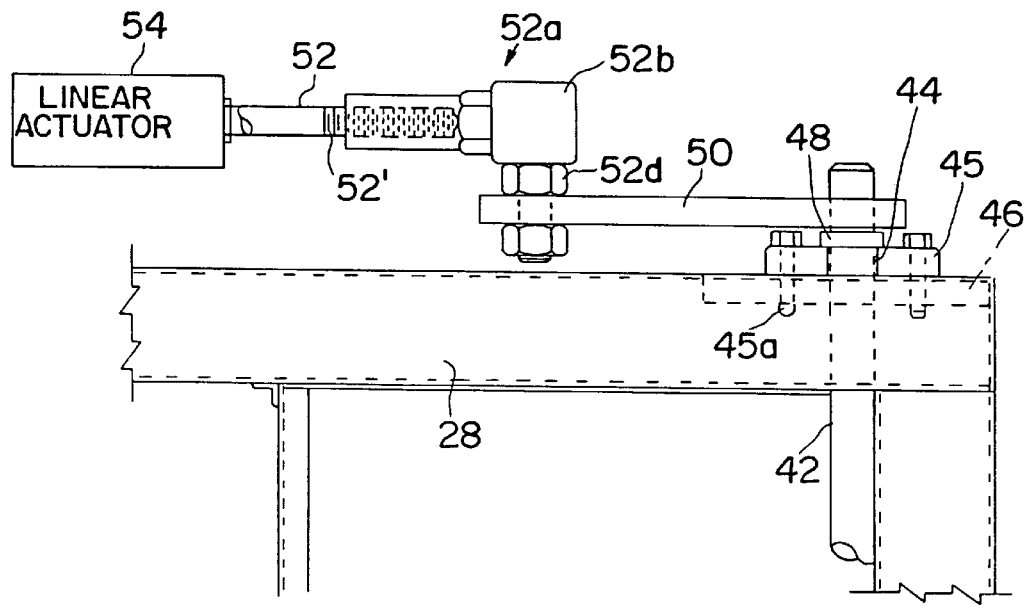
FIG. 5 is an enlarged view of a portion of FIG. 3 showing a crankarm mounted to a shaft.
Figure 6:
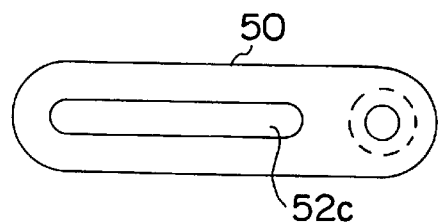
FIG. 6 is a schematic side elevation view of the crankarm.

As shown in FIGS. 5 and 6, one end of a crankarm 50 is mounted to each shaft 40, 42 and connects at its other end to the output shaft 52 of a linear actuator 54. The output shaft 52 includes a mounting assembly, indicated generally at 52a that receives a threaded portion 52' of the output shaft 52. The crank arm 50 includes a slot 52c (FIG. 6), which allows for slidable adjustment of the actuator arm 52 via a bolt 52d extending into mounting block 52b.

A controller 60 is connected to the linear actuators 54 and controls their operation. An air volume sensor 62 is positioned upstream of the invention 20 and generates a signal to the controller 60. The controller 60 is connected to the linear actuators 54. It should be understood that one or two linear activators could be used (with a coordinating shaft).

In operation, when a large number of chemical fume hoods 12, 14 cease operation, the amount of air discharged through the exhaust system 16 decreases and the air velocity sensor 62 mounted in the air stream 18c measures this decrease in air volume. The air volume sensor 62 then sends a signal to the controller 60 representative of the new measured volume of the discharged air. The controller 60 is pre-programmed and sends the appropriate signal to the linear actuators 54, which then withdraw the actuator output shafts 52 a predetermined distance so that the damper blades 30, 32 move downward into the air exhaust duct 18 and narrow the opening in the air exhaust duct 18 through air which is discharged. This creates a greater velocity of air through the duct to compensate for the reduced volume of discharged air. Because the parabolic shape of the damper reduces the eddy currents behind the damper blade, there is minimal vibration and dispersion of flow. Any material that is collected on the parabolic blades flows onto a drip ledge 64 and out a drain hole 66 (FIG. 4).

The controller 60 can operate in a closed loop or open loop mode, and will be programmed accordingly.

It is evident that the present invention is advantageous because it now allows a damper to maintain a constant air velocity through a discharge opening of an air exhaust duct without necessitating the diversion of ambient air into the duct. Thus, energy is saved, reducing the total maintenance and operating costs of the facility.

What has been described is illustrative of the present invention. Other applications other than the disclosed apparatus and system are contemplated as being within the knowledge of one skilled in the art, and may be used without departing from the spirit and scope of the present invention.

That which is claimed is:

1. A damper for maintaining a constant air velocity through an air exhaust duct opening comprising an air exhaust duct having a charge opening and a discharge opening defining an air flow path, opposing damper blades pivotally mounted within the air exhaust duct and within the flow path, each damper blade having an end that is pivotally mounted in cantilevered fashion in the duct so that an opposing end is free to move within the duct, wherein each damper blade is parabolic in shape to minimize the air turbulence over the damper blade, improve plume shape and reduce vibration, and means for pivoting each damper blade within the duct in response to a change in air volume discharged along the flow path through the duct to vary the discharge opening through the duct and maintain a desired velocity of air as it exits the discharge opening.

2. A damper according to claim 1 including opposing shafts mounted in the duct and extending across the duct adjacent opposing sides of the duct and wherein the supported end of a respective damper blade is mounted on the shaft.

3. A damper according to claim 2 including means for rotating each shaft for moving an unsupported end of the damper blade within the duct.

4. A damper according to claim 2 wherein said means for rotating each shaft comprises a crankarm mounted to each shaft, and a linear actuator mounted to each crankarm for rotating respective shafts.

5. A damper according to claim 1 including a sensor for measuring air volume change within the duct and a controller operatively connected to the sensor and each damper blade for controlling pivotal movement of each damper blade in response to the measured change in the air volume so as to maintain a substantially constant velocity of air through the discharge opening.

6. A damper according to claim 1 including a drip ledge mounted in the duct adjacent and under each supported end of each damper blade for collecting precipitates that collect on the damper blade.

7. An exhaust system that maintains a constant velocity discharge comprising an air exhaust duct having a charge opening and a discharge opening defining an air flow path for receiving exhaust air from a discharge system, opposing damper blades pivotally mounted within the air exhaust duct and within the flow path, each damper blade having an end that is supported in cantilevered fashion in the duct so that an opposing end is free to move within the duct, wherein each damper blade is parabolic in shape to minimize the turbulence over the blade and reduce vibration, and means for pivoting each blade within the duct to vary the discharge opening through the duct, a sensor for measuring air volume change along the air flow path within the duct, and a controller operatively connected to the sensor and each blade pivoting means for controlling pivotal movement of each parabolic damper blade in response to the measured change in the air volume along the air flow path so as to maintain a substantially constant velocity of air as it exits the discharge opening.

8. The exhaust system according to claim 7 wherein said exhaust air is received from a plurality of sources that have different amounts of exhaust air.

9. The exhaust system according to claim 7 including opposing shafts mounted in the duct and extending across the duct adjacent opposing sides of the duct and wherein the supported end of a respective damper blade is mounted on the shaft.

10. The exhaust system according to claim 9 including means for rotating each shaft for moving an unsupported end of the damper blade within the damper.

11. The exhaust system according to claim 10 wherein said means for rotating each shaft comprises a crankarm mounted to each shaft, and a linear actuator mounted to each crankarm for rotating respective shafts.

12. The exhaust system according to claim 7 including a drip ledge mounted in the duct adjacent and under each supported end of each damper blade for collecting precipitates that collect on the damper blade.

* * * * *